(12) United States Patent
Pettigrew et al.

(10) Patent No.: US 8,203,571 B2
(45) Date of Patent: Jun. 19, 2012

(54) 3D HISTOGRAM FOR COLOR IMAGES

(75) Inventors: Daniel Pettigrew, Pacific Palisades, CA (US); Jean-Pierre Mouilleseaux, Venice, CA (US); Dan Candela, Santa Monica, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/227,282

(22) Filed: Sep. 7, 2011

(65) Prior Publication Data

US 2011/0316851 A1     Dec. 29, 2011

Related U.S. Application Data

(63) Continuation of application No. 11/408,741, filed on Apr. 21, 2006, now Pat. No. 8,022,964.

(51) Int. Cl.
*G09G 5/02* (2006.01)

(52) U.S. Cl. ........ 345/594; 345/419; 345/589; 345/590; 345/591; 345/597; 382/168; 382/169; 382/274; 715/763; 715/848; 715/849

(58) Field of Classification Search .................. None
See application file for complete search history.

(56) References Cited

U.S. PATENT DOCUMENTS

| | | | |
|---|---|---|---|
| 5,519,515 | A | 5/1996 | Komatsu |
| 6,185,325 | B1 | 2/2001 | Sakaida et al. |
| 6,259,428 | B1 | 7/2001 | Ramchandani |
| 6,292,167 | B1 | 9/2001 | Throup |
| 6,292,195 | B1 | 9/2001 | Shimizu et al. |
| 6,323,969 | B1 | 11/2001 | Shimizu et al. |
| 6,362,829 | B1 | 3/2002 | Omvik et al. |
| 6,429,875 | B1 | 8/2002 | Pettigrew et al. |
| 6,445,816 | B1 | 9/2002 | Pettigrew |
| 6,456,300 | B1 | 9/2002 | Pettigrew |
| 6,496,599 | B1 | 12/2002 | Pettigrew |
| 6,571,012 | B1 | 5/2003 | Pettigrew |
| 6,637,861 | B2 | 10/2003 | Yamamoto |
| 6,724,500 | B1 | 4/2004 | Hains et al. |
| 6,751,347 | B2 | 6/2004 | Pettigrew et al. |
| 6,754,399 | B2 | 6/2004 | Pettigrew et al. |
| 6,757,425 | B2 | 6/2004 | Pettigrew et al. |

(Continued)

FOREIGN PATENT DOCUMENTS

EP     947956     10/1999

(Continued)

OTHER PUBLICATIONS

Ludlam, Eric, "Sliceomatic" http://www.mathworks.com/matlabcentral/fileexchange/764 Sep. 19, 2001, updated Nov. 18, 2008. Date Accessed via web: Nov. 10, 2011.*

(Continued)

*Primary Examiner* — Antonio A Caschera
(74) *Attorney, Agent, or Firm* — Fish & Richardson P.C.

(57) ABSTRACT

The disclosed implementations relate generally to 3D histograms and other user interface elements for color correcting digital images. A color correction method includes: generating a user interface for display on a display device, the user interface including a display area; generating a three-dimensional cube representing a color space for display in the display area; and generating a plurality of spheres for display within the cube, where the spheres are sized to represent pixel densities in a digital image.

21 Claims, 14 Drawing Sheets

U.S. PATENT DOCUMENTS

| | | |
|---|---|---|
| 6,798,412 B2 | 9/2004 | Cowperthwaite |
| 6,833,843 B2 | 12/2004 | Mojaver et al. |
| 6,836,563 B2 * | 12/2004 | Dawson ................ 382/162 |
| 6,898,309 B2 | 5/2005 | Pettigrew et al. |
| 6,903,762 B2 | 6/2005 | Prabhu et al. |
| 6,919,892 B1 | 7/2005 | Cheiky et al. |
| 6,919,924 B1 | 7/2005 | Terashita |
| 6,928,187 B2 | 8/2005 | Cooper et al. |
| 6,944,335 B2 | 9/2005 | Pettigrew et al. |
| 6,947,135 B2 | 9/2005 | Johnson |
| 6,999,617 B1 | 2/2006 | Ohga |
| 7,003,140 B2 | 2/2006 | Venkatachalam |
| 7,003,178 B2 | 2/2006 | Pettigrew et al. |
| 7,038,735 B2 | 5/2006 | Coleman et al. |
| 7,083,278 B2 | 8/2006 | Broderick et al. |
| 7,268,913 B2 | 9/2007 | Murashita |
| 7,411,698 B2 * | 8/2008 | Gallina ................ 358/1.9 |
| 7,423,791 B2 | 9/2008 | Tin |
| 7,586,644 B2 | 9/2009 | Walton et al. |
| 7,671,871 B2 * | 3/2010 | Gonsalves ............ 345/594 |
| 7,706,036 B2 | 4/2010 | Yoshida et al. |
| 8,022,964 B2 * | 9/2011 | Pettigrew et al. ........ 345/594 |
| 2002/0024517 A1 | 2/2002 | Yamaguchi et al. |
| 2003/0206665 A1 | 11/2003 | Pettigrew |
| 2004/0264766 A1 | 12/2004 | Pettigrew |
| 2004/0264767 A1 | 12/2004 | Pettigrew |
| 2005/0046902 A1 | 3/2005 | Sugimoto |
| 2005/0122543 A1 | 6/2005 | Walker |
| 2005/0140994 A1 | 6/2005 | Hasegawa |
| 2005/0147314 A1 | 7/2005 | Kokemohr |
| 2005/0174590 A1 | 8/2005 | Kubo |
| 2005/0190198 A1 | 9/2005 | Koyama |
| 2005/0276481 A1 | 12/2005 | Enomoto |
| 2005/0280846 A1 | 12/2005 | Ichitani |
| 2006/0013478 A1 | 1/2006 | Ito et al. |
| 2006/0017855 A1 | 1/2006 | Yamada |
| 2006/0170682 A1 | 8/2006 | Van Liere |
| 2007/0035753 A1 | 2/2007 | Ichitani |
| 2007/0188814 A1 | 8/2007 | Walton et al. |
| 2007/0247647 A1 | 10/2007 | Pettigrew et al. |
| 2007/0247679 A1 | 10/2007 | Pettigrew et al. |

FOREIGN PATENT DOCUMENTS

| | | |
|---|---|---|
| JP | 09-069961 | 11/1997 |
| WO | 96/08918 | 3/1996 |

OTHER PUBLICATIONS

Selan, Jeremy, "GPU Gems 2: Chapter 24, Using Lookup Tables to Accelerate Color Transformations", pp. 381-392.

International Search Report and Written Opinion, mailed Dec. 10, 2007, issued in International Application No. PCT/US2007/067144, 9 pages.

International Preliminary Report on Patentability, dated Oct. 22, 2008, issued in International Application No. PCT/US2007/067144, 7 pages.

* cited by examiner

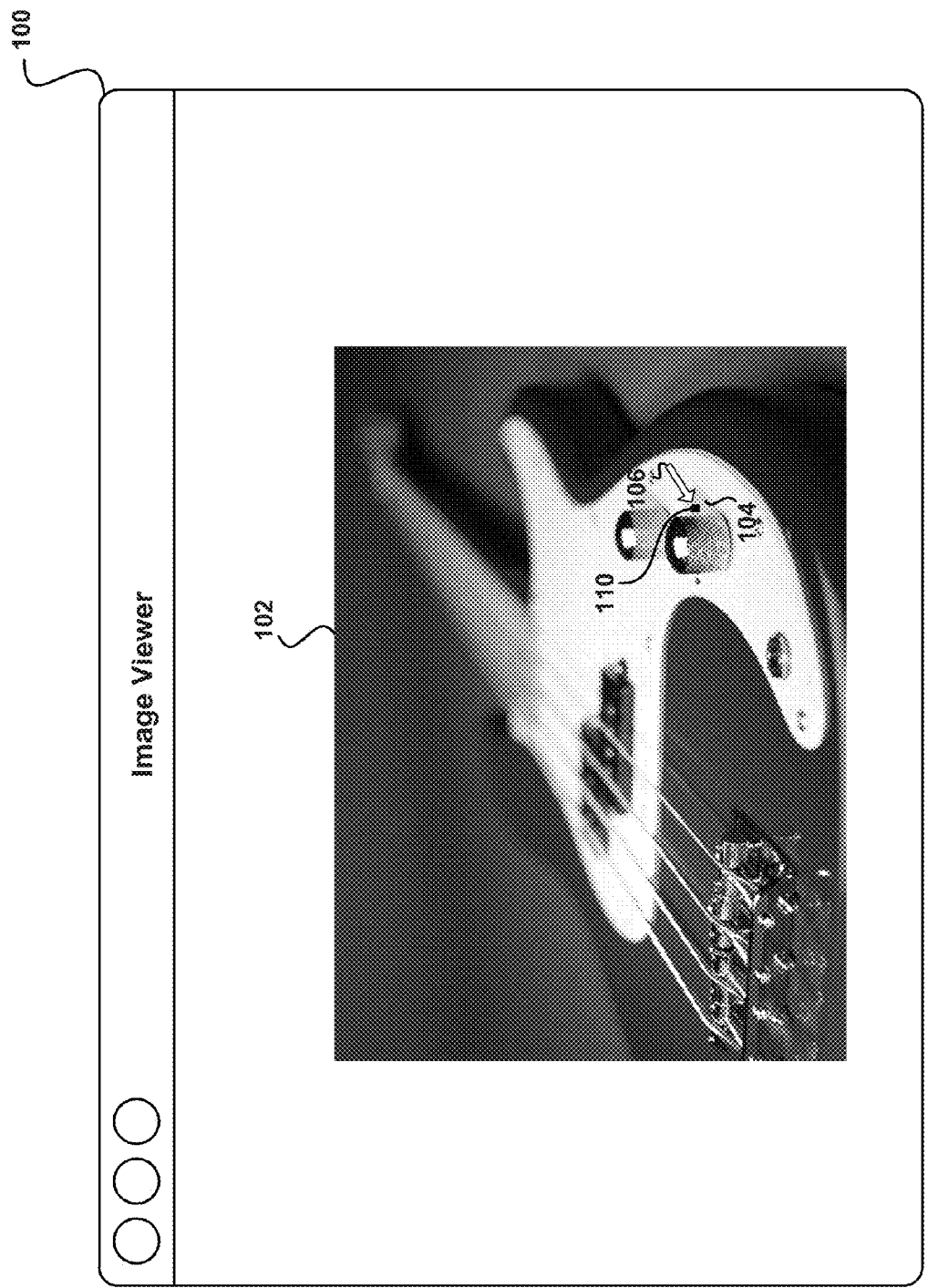

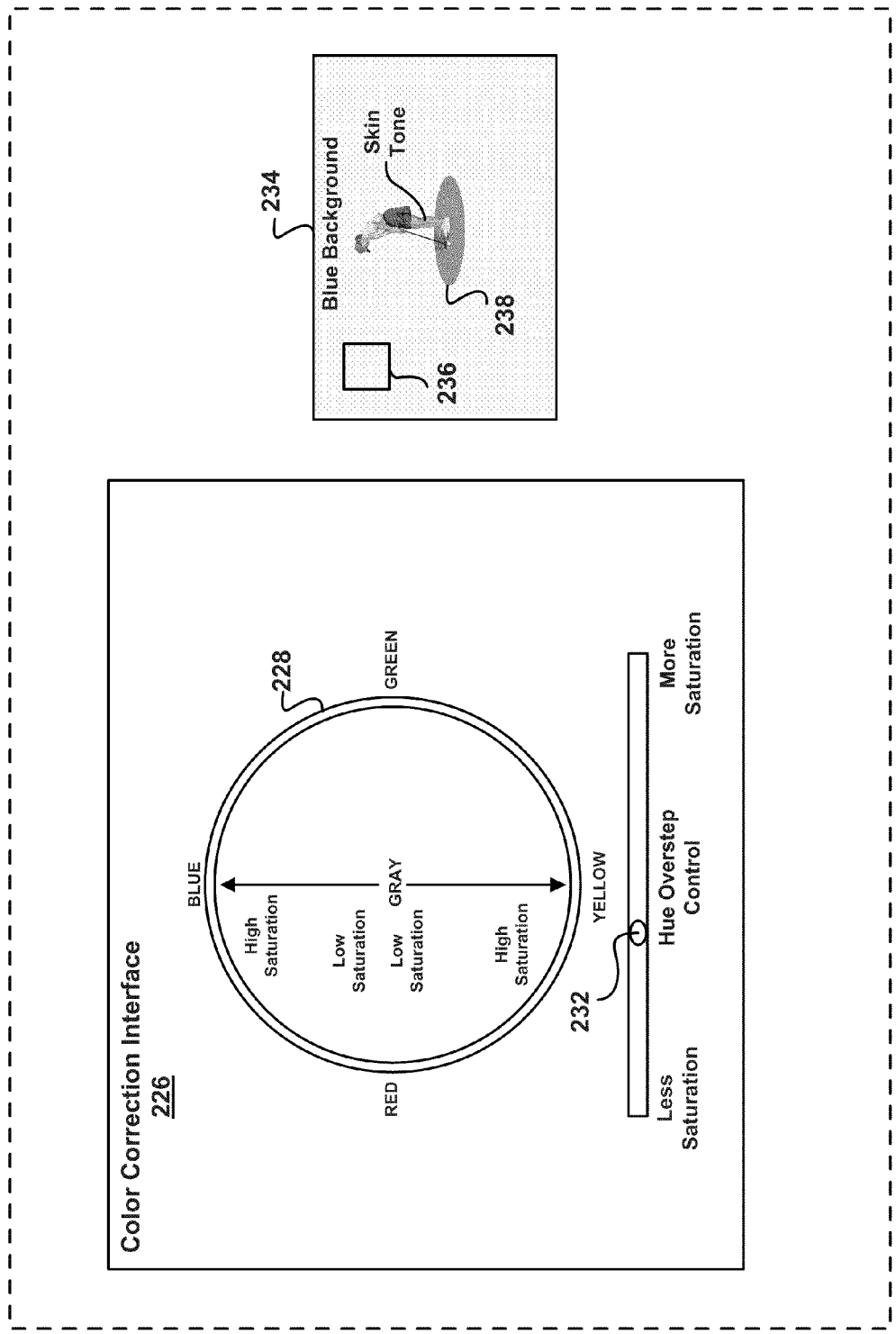

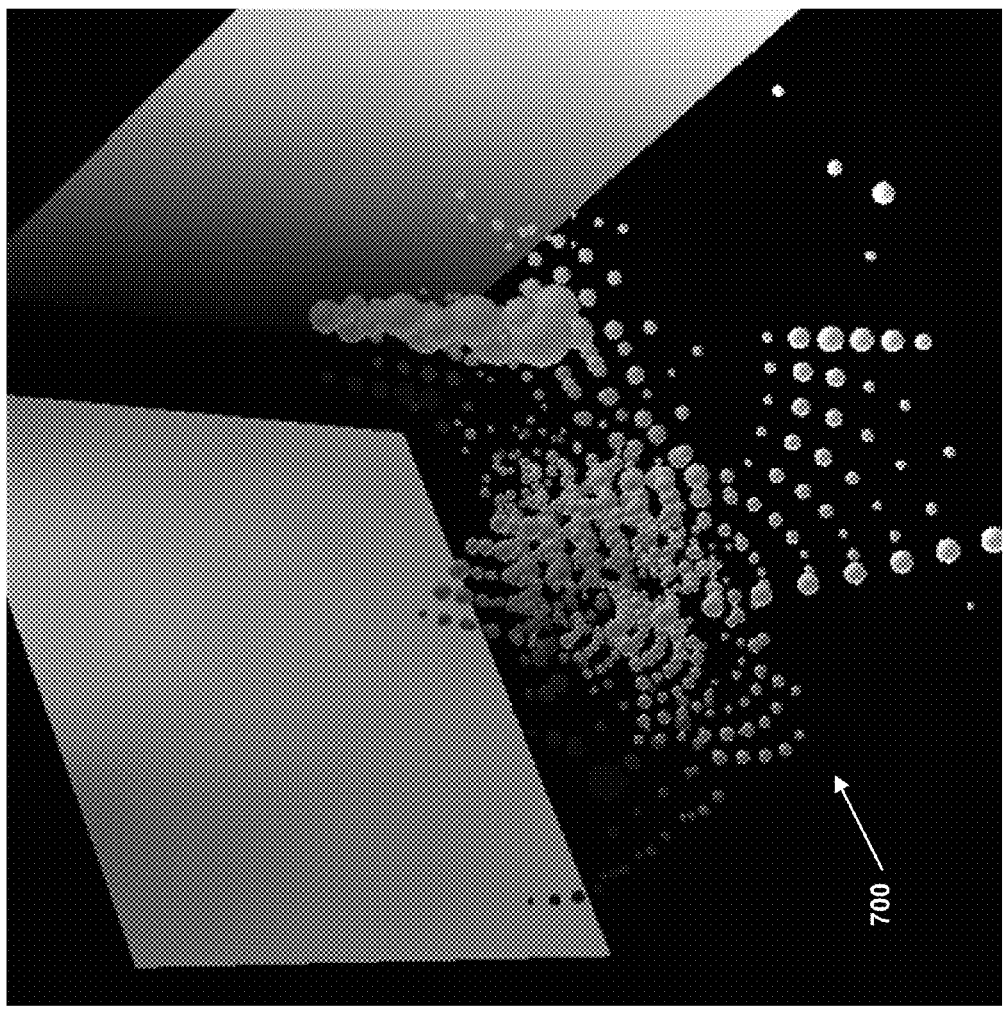

US 8,203,571 B2

3D HISTOGRAM FOR COLOR IMAGES

RELATED APPLICATIONS

This application is a Continuation Application of U.S. patent application Ser. No. 11/408,741, filed Apr. 21, 2006, entitled "3D Histogram and other User Interface Elements for Color Correcting Images", which is related to co-pending U.S. patent application Ser. No. 11/409,553, filed Apr. 21, 2006, Granted U.S. Pat. No. 7,693,341, entitled "Improved Workflows For Color Correcting Images,", and U.S. patent application Ser, No. 11/408,783, filed Apr. 21, 2006, entitled "3D LUT Techniques For Color Correcting Images. The subject matter of each of these patent applications is incorporated by reference herein in its entirety.

TECHNICAL FIELD

The disclosed implementations are generally related to digital image processing.

BACKGROUND

Color correction tools are used in the film industry and other disciplines to alter the perceived color of an image. Conventional color correction tools typically allow users to perform primary and secondary color corrections. Primary color correction involves correcting the color of an entire image, such as adjusting the blacks, whites or gray tones of the image. Secondary color correction involves correcting a particular color range in an image. For example, a user may want to change the color of an object in an image from red to blue. The user would identify the range of red in the object and then push the hue to blue. This process could also be applied to other objects in the image.

Color corrections are usually performed in a color space, such as the ubiquitous RGB (Red, Green, Blue) color space. These color spaces can be represented by a three-dimensional (3D) coordinate system, where the three axes of the coordinate system represents components associated with the color space. For example, in the RGB color space the three axes represent contributions of Red, Green and Blue. A color can be located in the RGB color space based on Red, Green and Blue contributions to the color. Since color corrections are performed in 3D color space, many colorists could benefit from a 3D color visualization tool for making precise primary and secondary color adjustments to digital images.

SUMMARY

The disclosed implementations relate generally to 3D histograms and other user interface elements for color correcting digital images.

In some implementations, a color correction method includes: generating a user interface for display on a display device, the user interface including a display area; generating a three-dimensional cube representing a color space for display in the display area; and generating a plurality of spheres for display within the cube, where the spheres are sized to represent pixel densities in a digital image.

In some implementations, a color correction method includes: generating a user interface for display on a display device, the user interface including a display area; and generating a color correction interface for display in the display area, the interface including a control for adjusting a selected hue range in a digital image, where the control allows for hue overstep.

Other implementations are disclosed that are directed to methods, systems, apparatuses, devices and user interfaces.

DESCRIPTION OF DRAWINGS

FIG. 1 illustrates an exemplary selection process for selecting a color range in a digital image.

FIG. 2c illustrates a user interaction with a hue overstep control.

FIG. 7 is a screenshot of an exemplary 3D histogram, which uses spheres as proxy elements to provide a visual representation of the average pixel density in the proximity of the sphere.

DETAILED DESCRIPTION

Selection Process

Figure 2A:
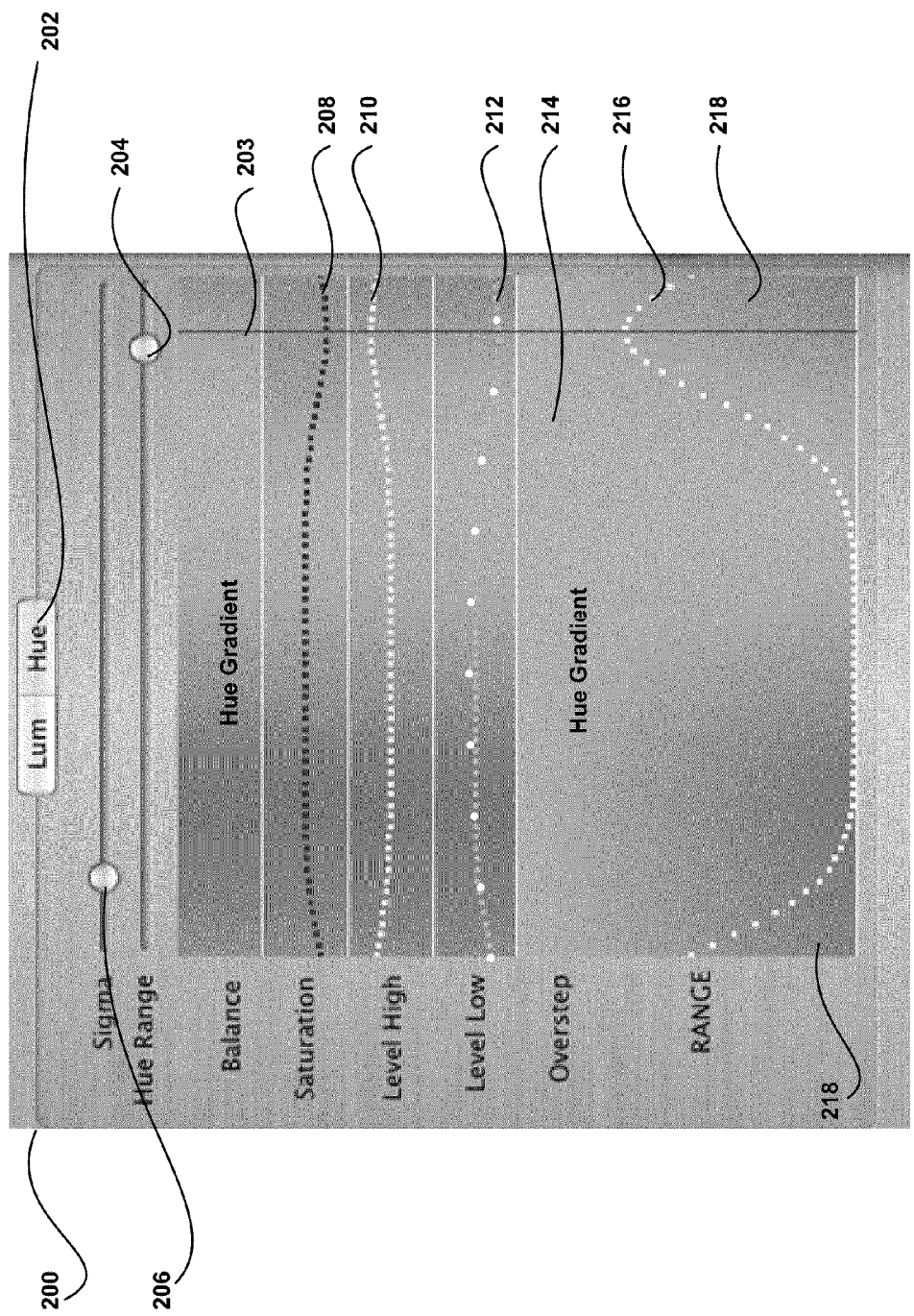
FIG. 2a is a screenshot of an exemplary 2D color correction interface for correcting a hue range.

FIG. 1 illustrates an exemplary selection process for selecting a color range in a digital image 102. In a color correction tool, an imager viewer 100 displays the digital image 102. The user can select a region 104 in the image 102 using a pointing device 106 (e.g., cursor). The range 104 can include colors that can be characterized as being in a range of hue, luminance and/or saturation values. In the example shown, the region 104 includes a shadow cast by a volume knob of a bass guitar. The shadow includes blue, gray and white tones. A visual indicator 110 (e.g., a marker or tag) can be provided to remind the user of the location of the selected region 104. Multiple regions in a digital image, or regions from two or more digital images, can be selected by the user in a similar manner. Each selected region can include a different visual indicator. In some implementations, the visual indicator can be painted with a color so as to improve visibility in the digital image. For example, the visual indicator 110 was painted black to make it stand out in the lighter colored region 104.

Color Correction Interfaces

FIG. 2A is a screenshot of an exemplary 2D color correction interface 200 for correcting a hue range in the digital image 102. In some implementations, the color correction interface 200 includes a user interface element 202 (e.g., button) for selecting a color correction mode. In the example shown, there are two modes available for selection: Luminance and Hue. Other modes are possible.

When the Hue mode is selected, the color correction interface 200 displays several curves and controls for adjusting hue characteristics. In some implementations, curves are displayed for saturation 208, level high 210 (e.g., white level), level low 212 (e.g., black level) and hue range 216. In the example shown, the curves represent color corrections that will be applied to the digital image 102 based on the hue range contained in the selected region 104. For example, the area 218 under the curve 216 represents the range of hue in the region 104. Rather than displaying numbers, the curves are displayed over a hue gradient that represents the colors contained in the digital image 102. The hue gradient provides an intuitive interface which is more aligned with how a colorist thinks about color correction. Note that the hue range curve 216 continues on the left side of the hue gradient surface so that a portion of the area 218 under the curve 216 is on the left side of the hue gradient.

Using controls 204 and 206, the user can adjust the hue range and sigma of the digital image 102 based on the hue range contained in region 104. As used herein, "sigma" is the spread of the hue range curve 216 when the central position of the hue range curve 216 corresponds to a specific hue value. Various user interface elements can be used as controls (e.g., buttons, sliders, knobs, editable curves, etc.). In the example shown, a vertical bar 203 is displayed to provide a plot of a specific pixel in the digital image 102 through a syringe. In the example shown, the vertical bar 203 is in the middle of the hue range of region 104. The user can use the controls in the interface 200 to color correct the digital image 102. Other 2D interfaces are described in U.S. Granted U.S. Pat. No. 7,693, 341, entitled "Improved Workflows for Color Correcting Images."

Hue Overstep

Figure 2B:
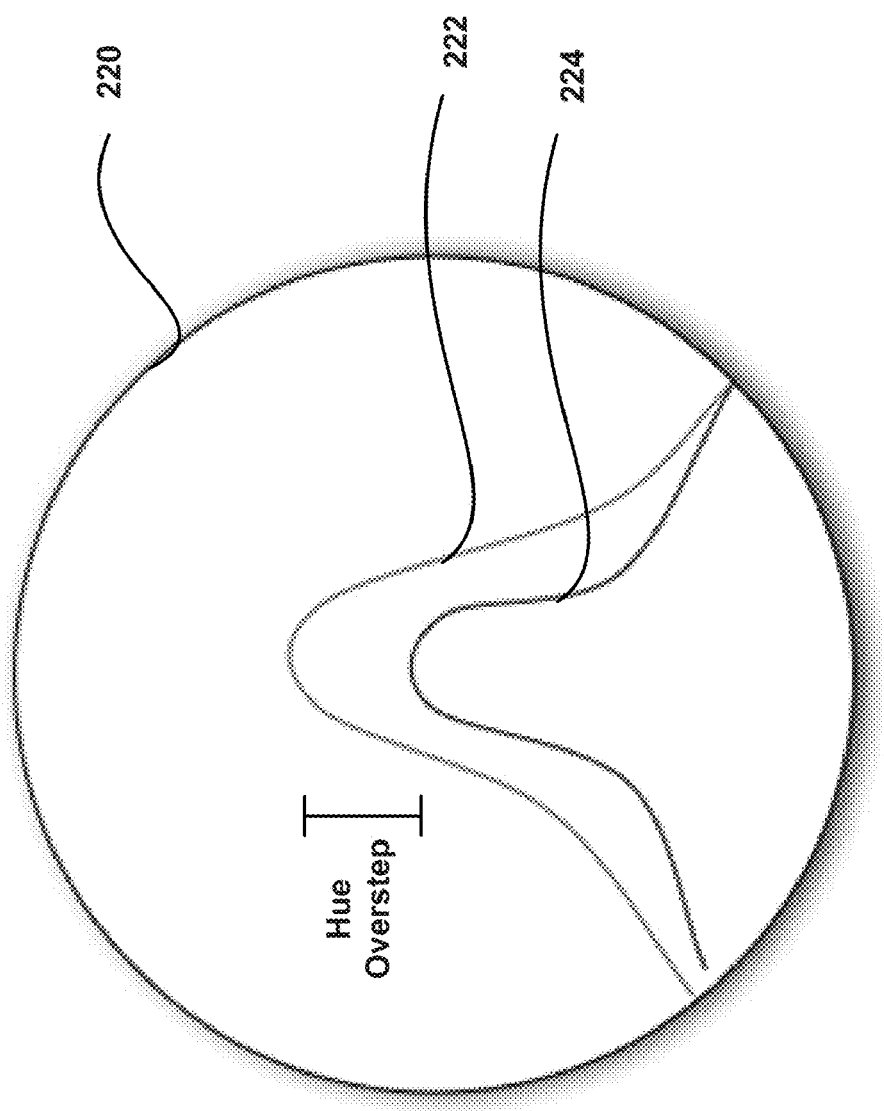
FIG. 2b illustrates the concept of hue overstep.

FIG. 2b illustrates the concept of hue overstep. A hue wheel 220 is a circle composed of colors that gradually transition between red, yellow green, cyan, blue, magenta and red again as one traverses the circle. Also, in the hue wheel 220 the center is gray and as you go toward the outside ring, the color becomes more saturated, i.e., more rich. A hue range curve 224 represents the hue range in region 104 (FIG. 1). The curve 224 corresponds to the curve 216 shown in FIG. 2a. The curve 222 is the same as curve 224 but has been adjusted to include a hue overstep (i.e., the difference in the peaks of the curves 222, 224). The area under the curve 224 represents the hue range of region 102. In some situations, when a color correction is applied to an image the desired result may not be achieved due to psychovisual factors associated with the human vision system. For example, skin tones may appear to have a blue tint even if blue has been removed from the image. To counteract such factors, the hue gradient shown in FIG. 2a can include a hue overstep region 214. In some implementations, the hue overstep region 214 can be used to include colors in the selection range that are opposite (in terms of hue) from the colors contained in the region 104. For example, the user can adjust the height of the range curve 216 (curve 224 in FIG. 2b) to include an opposite color at a low saturation value in the hue overstep region 214 until the desired color selection is achieved.

Referring to FIG. 2c, an example of a user interaction with a hue overstep control 232 in a color correction interface 226 will now be described. In the example shown, a user selected a blue region 236 in an image 234 that also contains an object 238 with skin tones (e.g., a women golfer against a blue background). When color correction is applied to correct blue portions of the object 238, the skin tone of the object 238 may still appear to contain some blue tint (due to surrounding psychological effect) that the user may wish to affect also. But to correct or affect that part, since it's not a blue range but truly a yellow range (the opposite of blue), and since that bluish tint will appear only in a region of low saturated values of the opposite color, the hue overstep adjustment can be applied to include in the selected range 236 some part of the low saturated opposite color. For the example shown, the blue color range is located at the top of a hue wheel 228 in the color correction interface 226. As the hue wheel 228 is traversed clockwise the blue range transitions into a green range and then into a yellow range. As the hue wheel 228 is traversed counterclockwise, the blue range transitions into a red range and then into a yellow range. A user can adjust the selected range 236 where a color correction could be applied in the image 234. The center of the hue wheel 228 represents colors with no saturation or gray tones. The more you move toward the external rings of the hue wheel 228, the more the colors represented by the hue wheel 228 are saturated.

The user can adjust the amount of hue overstep by manipulating a hue overstep control 232 until the desired color correction is achieved. By manipulating the hue overstep control 232 the color that is opposite blue on the hue wheel 228 (i.e., yellow) is added to the selection range 236 of the current correction of the image in varying saturation amounts, as shown in FIG. 2c. As the user moves the control 232 to the right more saturated yellow tones are added to the selection range 236. As the user moves the control 232 to the left, less saturated yellow tones are added to the selection range 236. In some implementations, a limited range of saturation values is allowed (e.g., a low saturation range) to achieve the desired result. When the control 232 is completely at the left, there will be no opposite color included in the selection range 236.

Luminance Corrections

Figure 3:
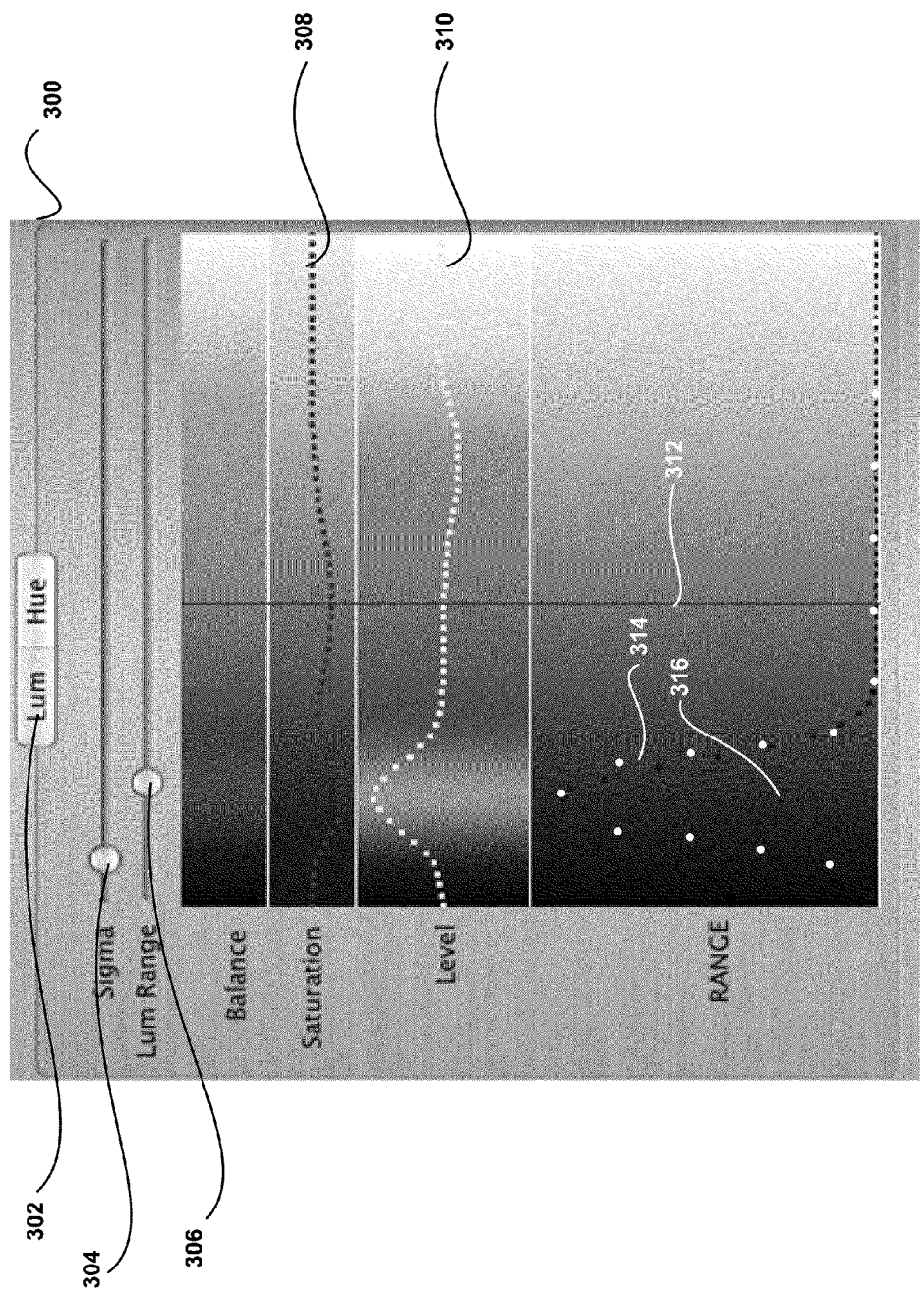
FIG. 3 is a screenshot of an exemplary 2D color correction interface for correcting a luminance range.

FIG. 3 is a screenshot of an exemplary 2D color correction interface 300 for correcting a luminance range. The color correction interface 300 is similar to the color correction interface 200, except the luminance mode has been selected by clicking the user interface element 302. The interface 300 displays curves for luminance saturation 308, level 310 and range 314 for the digital image 102. An area 316 under the range curve 314 represents the luminance range in region 104. The user can adjust luminance range and sigma values with controls 306 and 304, respectively. A vertical bar 312 is a plot of a specific pixel obtained in the digital image 102 through a syringe. Similar to the user interface 200, the curves 308, 310 and 314, are displayed over a luminance gradient to provide a more intuitive interface.

3D Histogram For Color Correction

Figure 4:
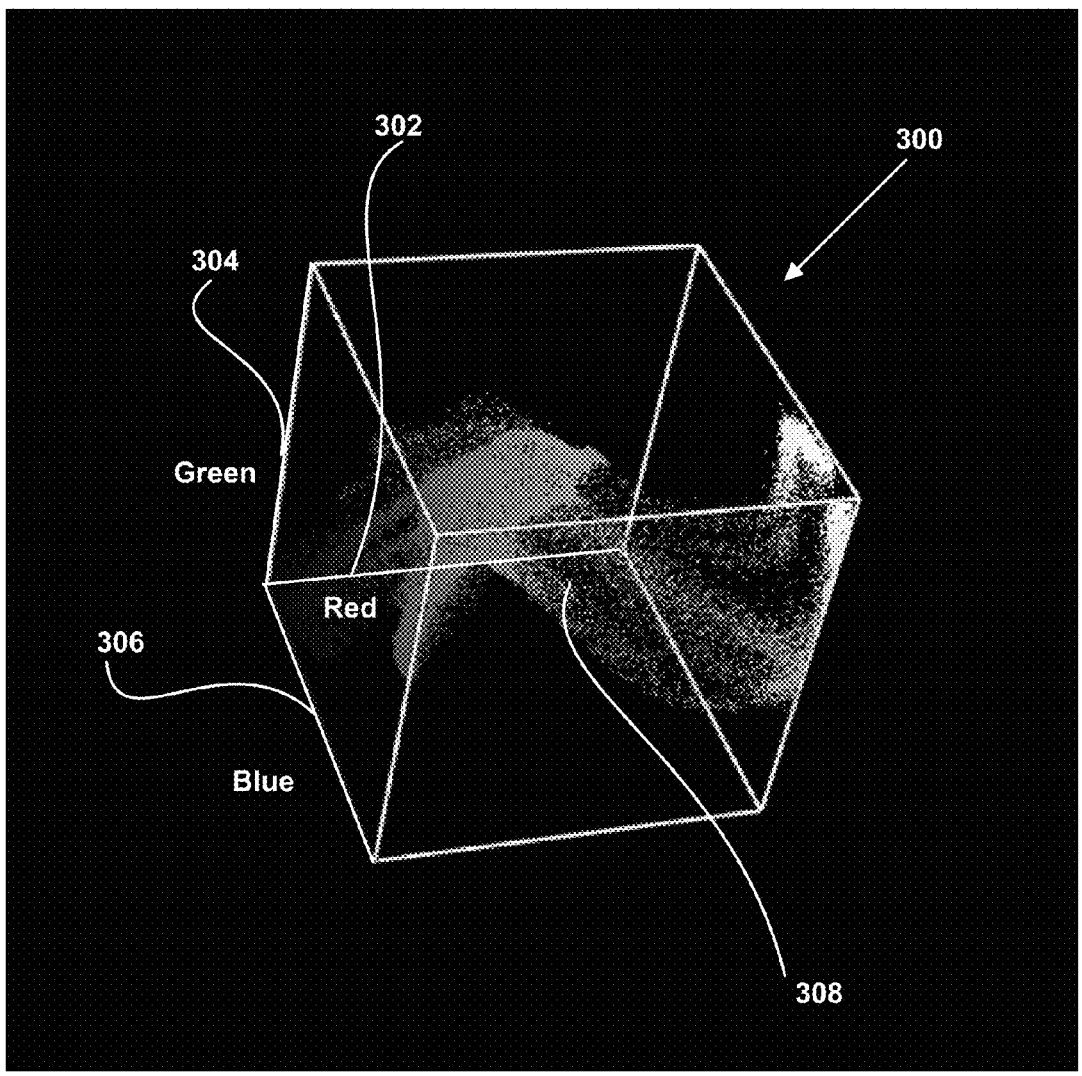
FIG. 4 is a screenshot of an exemplary 3D histogram showing a representation of pixel values of a digital image in RGB color space.

FIG. 4 is a screenshot of an exemplary 3D color histogram showing a representation of pixel values of a color corrected digital image in 3D color space. As the user corrects a digital image, the 3D color histogram is updated in real time. In some implementations, the real-time responsiveness can be provided by a 3D LUT, as described in co-pending U.S. patent application Ser. No. 11/408,783, entitled "3D LUT Techniques for Color Correcting Images."

In the example shown, the 3D histogram includes a cube 300 representing a bounded color space (e.g., RGB color space) with three coordinate axes. A first axis 302 represents Red, a second axis 306 represents Blue and a third axis represents Green. A 3D color distribution 308 is displayed within the cube 300. In this example, the distribution 308 is a one to one representation of pixel values. That is, each pixel is represented by a single point inside the cube 300. The position of the point is determined by contributions from Red, Green and Blue components. For example, a pixel that contains only blue would be represented by a point located along the Blue axis 306 in the cube 300. Similarly, a pixel having a color value with equal amounts of red, green and blue would be represented by a point located in the center of the cube 300.

3D Histogram With Proxy Elements

Figure 5:
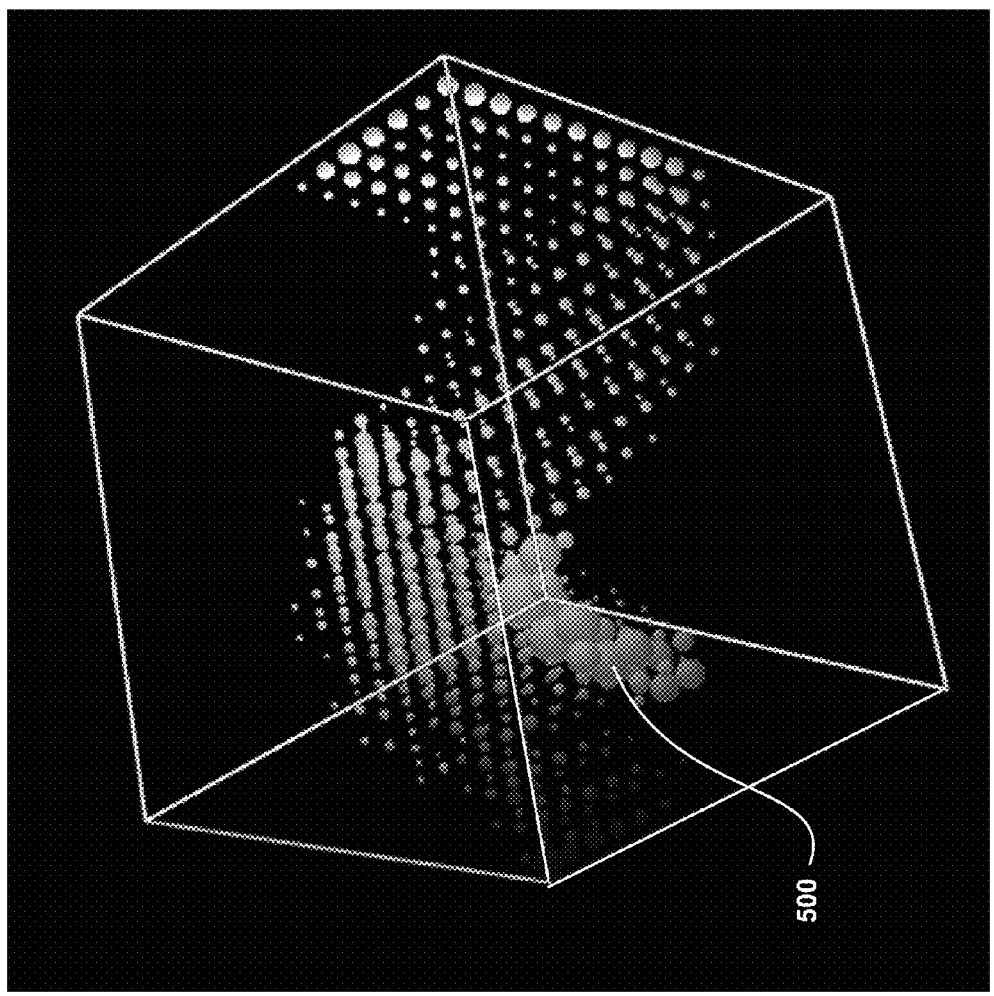
FIG. 5 is a screenshot of an exemplary 3D histogram showing the distribution of pixel densities in RGB color space with proxy elements.

FIG. 5 is a screenshot of an exemplary 3D color histogram showing the distribution of pixel densities in an RGB color space using proxy elements 500 to provide a visual representation of pixel density. Pixel densities are the correlation of the number of pixels found in the digital image with a specific color in the proximity range of each element 500 in the 3D histogram. In some implementations, a user may desire only a visual approximation of color distribution in a digital image. In the example shown, a number of pixel values is replaced with a single proxy element 500. The proxy element 500 can be any object (e.g., cubes, triangles, spheres, etc.). The use of spheres as proxy elements 500 provides a significant advantage over cube-shaped proxy elements for specifying densities. Cube-shaped proxy elements that are displayed too close together can appear as one large cube, resulting in a display that is difficult to read. On the other hand, spheres can be displayed close to each other because of there shape, resulting in a display that is much easier to read (similar to a cluster of molecules). In some implementations, the size of the proxy elements 500 can be adjusted to indicate the pixel densities in the digital image that are represented by the proxy elements 500. In the example shown, large spheres represent large pixel densities and small spheres represent small pixel densities. Other representations of pixel density are possible.

3D Histogram With Gradient Surfaces

Figure 6:
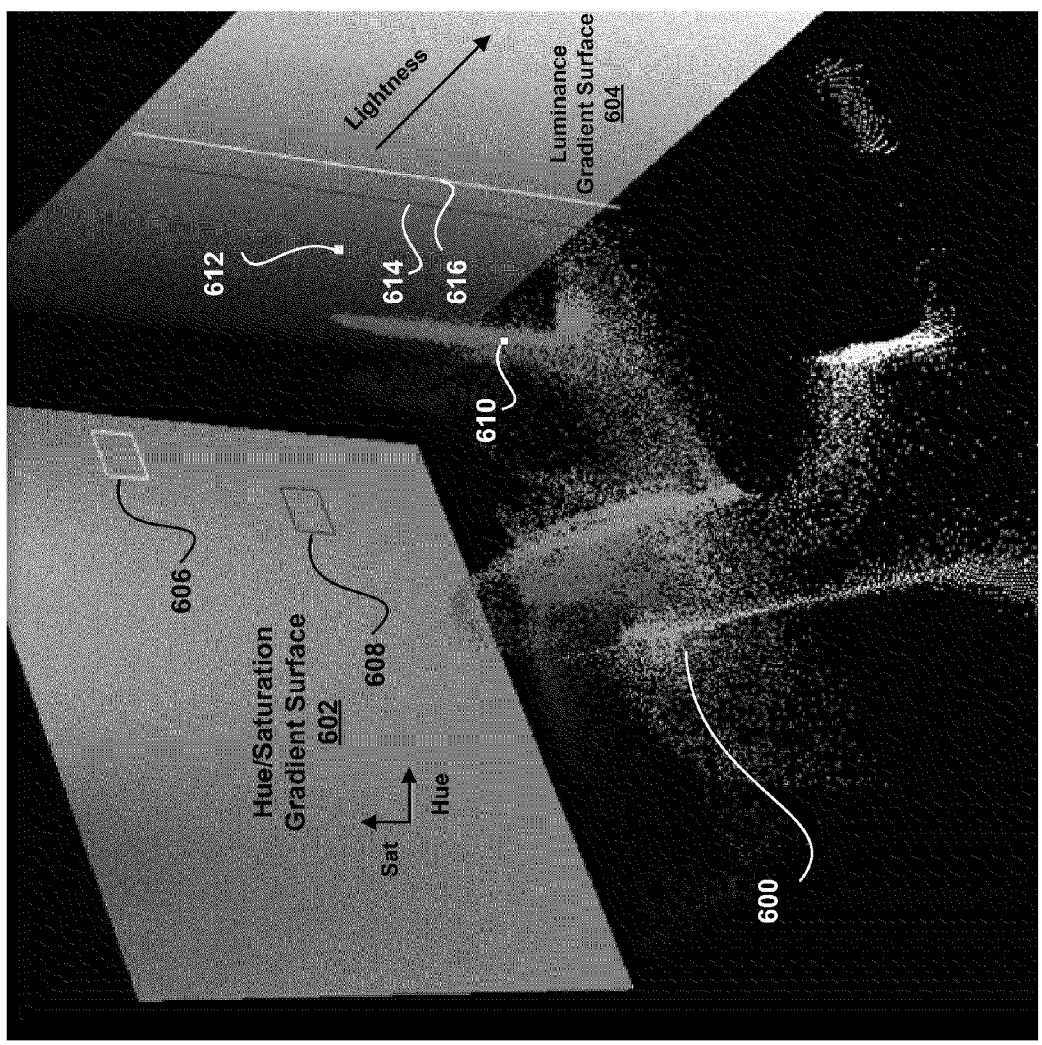
FIG. 6 is a screenshot of an exemplary 3D histogram showing the distribution of pixel values of a digital image in HLS (Hue, Lightness, Saturation) color space.

FIG. 6 is a screenshot of an exemplary 3D histogram showing a 3D color distribution 600 of pixel values for a digital image in HLS (Hue, Lightness, Saturation) color space. In the example shown, the three axes represent Hue, Lightness and Saturation of a color instead of representing the Red, Green and Blue components, as previously shown in FIGS. 4 and 5. In some implementations, the 3D color histogram includes hue/saturation and luminance gradient surfaces 602 and 604. The surfaces 602, 604, are provided as visual reminders to the user of the meaning of the corresponding axes that they represent. The hue/saturation gradient surface 602 includes a gradient of colors in the digital image to be corrected. The luminance gradient surface 604 includes a gradient of luminance (or brightness) in the digital image. In the example shown, two colors that were previously plotted by a user (FIG. 1) in the digital image 102 are shown in the 3D histogram as references 610 and 612. Any desired number of references can be included in the 3D histogram, and each reference can refer to a different color plotted by the user in one or more digital images.

To assist the user in color correction of hue ranges, the hue/saturation gradient surface 602 includes projections 606 and 608 corresponding to references 610 and 612, respectively. In the example shown, the projections 606 and 608 are rectangles. The centers of the rectangles 606, 608, represent the axis intersection of the Hue value with the Saturation value of the plotted pixel. Other representations of projections are possible. Projections can be painted with the same color as their corresponding references or otherwise altered or embellished to form a visual association with a corresponding reference.

To assist the user in color correction of luminance ranges, the luminance gradient surface 604 includes projections 614 and 616 corresponding to references 610 and 612. In the example shown, the projections 614 and 616 are vertical bars and are painted with the same color as their corresponding references 610 and 612. Note that vertical bars are used instead of points because only the lightness axis in the HLS color space is represented. Thus, the gradient surface 604 provides a visual cue for the lightness axis only, while the gradient surface 602 for hue/saturation provides a visual cue for both the hue and the saturation axes in HLS color space. That is, the lightness gradient surface 604 is a 1D gradient and the hue/saturation gradient surface 602 is a 2D gradient because it includes two axes.

FIG. 7 is a screenshot of the 3D histogram shown in FIG. 6. In this example, the color distribution 700 is represented by spheres, which are proxy elements for indicating pixel density. The color of the spheres correspond to their respective positions in the 3D histogram. The size of the spheres correspond to the pixel density for a particular color range.

Figure 8A:
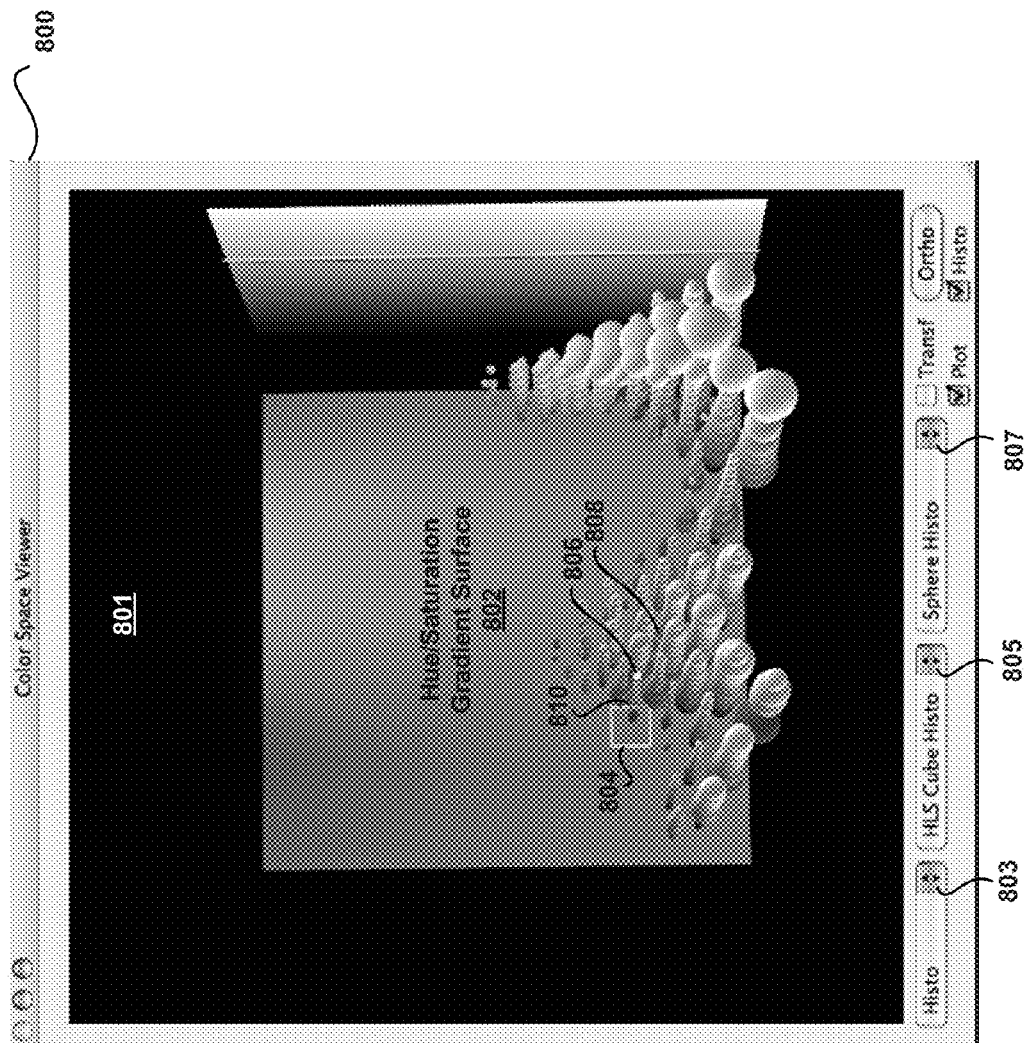
FIG. 8a is a screenshot of an exemplary 3D histogram for HLS color space, showing a different viewer perspective.

FIG. 8*a* is a screenshot of an exemplary 3D histogram for HLS color space. The 3D histogram is shown displayed in a display area 801 of a user interface 800. Also displayed are a hue gradient surface 802 for displaying projections 804 and 810 corresponding to references 806 and 808, respectively. A user interface element 803 can be used to select the 3D histogram for display in the display area 801. A user interface element 805 can be used to select a color space for the 3D correction histogram. In the example shown, HLS color space was selected. Other color spaces can also be represented by a 3D histogram (e.g., RGB, Y'CbCr, CIELAB, etc.). A user interface element 807 can be used to select between a proxy element (e.g., a sphere representing density) or a "cloud" of points representing pixel values without any density information, as shown in FIG. 6. User interface elements can be any mechanism that can be presented in the user interface 801 and that can receive user input (e.g., a menu, dialog pane, check box, button, slider, knob, hot spot, etc.)

Figure 8B:
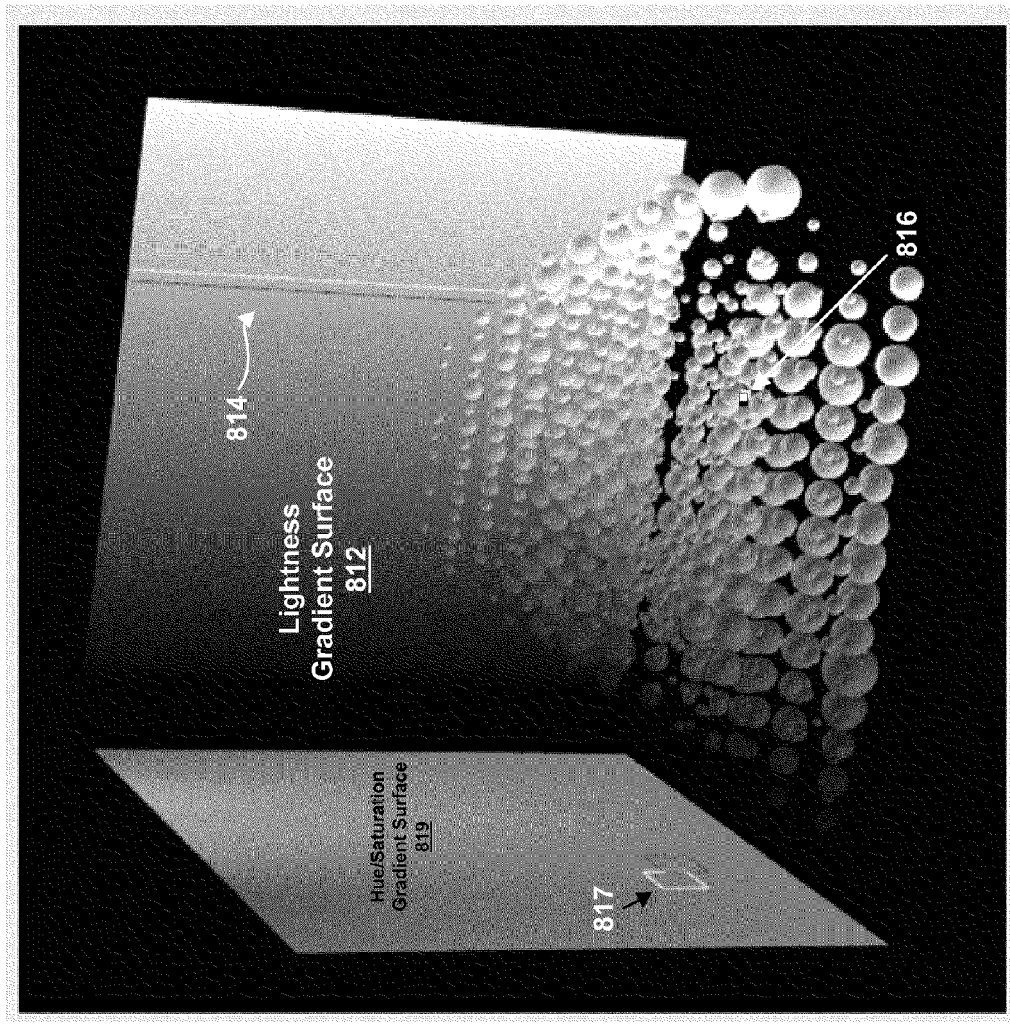
FIG. 8b is a screenshot of an exemplary 3D histogram for HLS color space, showing a different viewer perspective (clockwise rotation about the Saturation axis).

FIG. 8*b* is a screenshot of the 3D histogram shown in FIG. 8, but showing a different viewer perspective. In some implementations, the user can change the "camera" view of the 3D color correction histogram through one or more user interface elements (e.g., menu options, hot spot, buttons, slider, etc.). In the example shown, the user has rotated the 3D histogram clockwise around the Saturation axis in HLS color space. From this perspective the user can see the positioning of the plot of a specific pixel chosen by the user through a syringe in the image. The lightness of that plot is displayed as a vertical bar 814 on the lightness gradient surface 812. The plot itself is located at references 816. The hue/saturation of that plot are represented as the center of the rectangle saw 817 on the hue/saturation gradient surface 819.

Figure 8C:
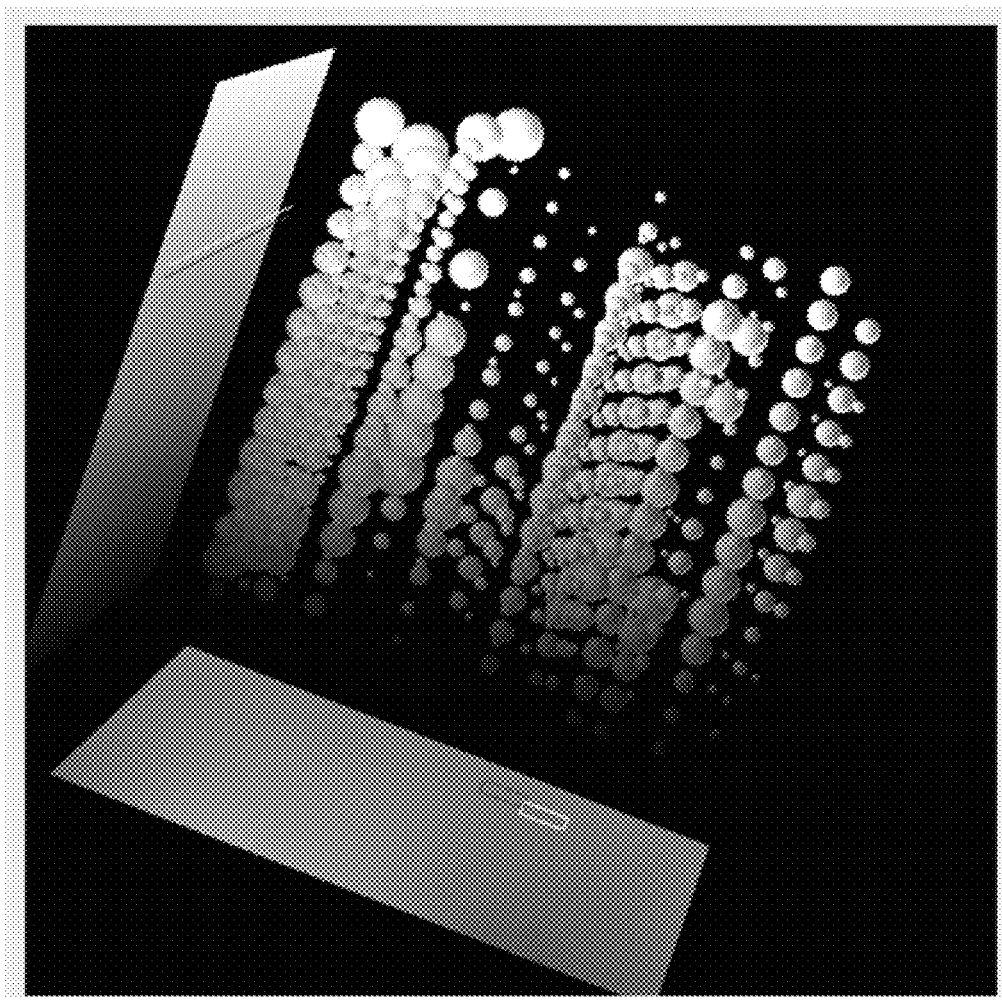
FIG. 8c is a screenshot of an exemplary 3D histogram for HLS color space, showing a different viewer perspective (looking down along the Saturation axis).

FIG. 8*c* is a screenshot of the 3D histogram of FIG. 8*b*, but showing a different perspective i.e., looking down along the Saturation axis.

Exemplary Color Correction System

Figure 9:
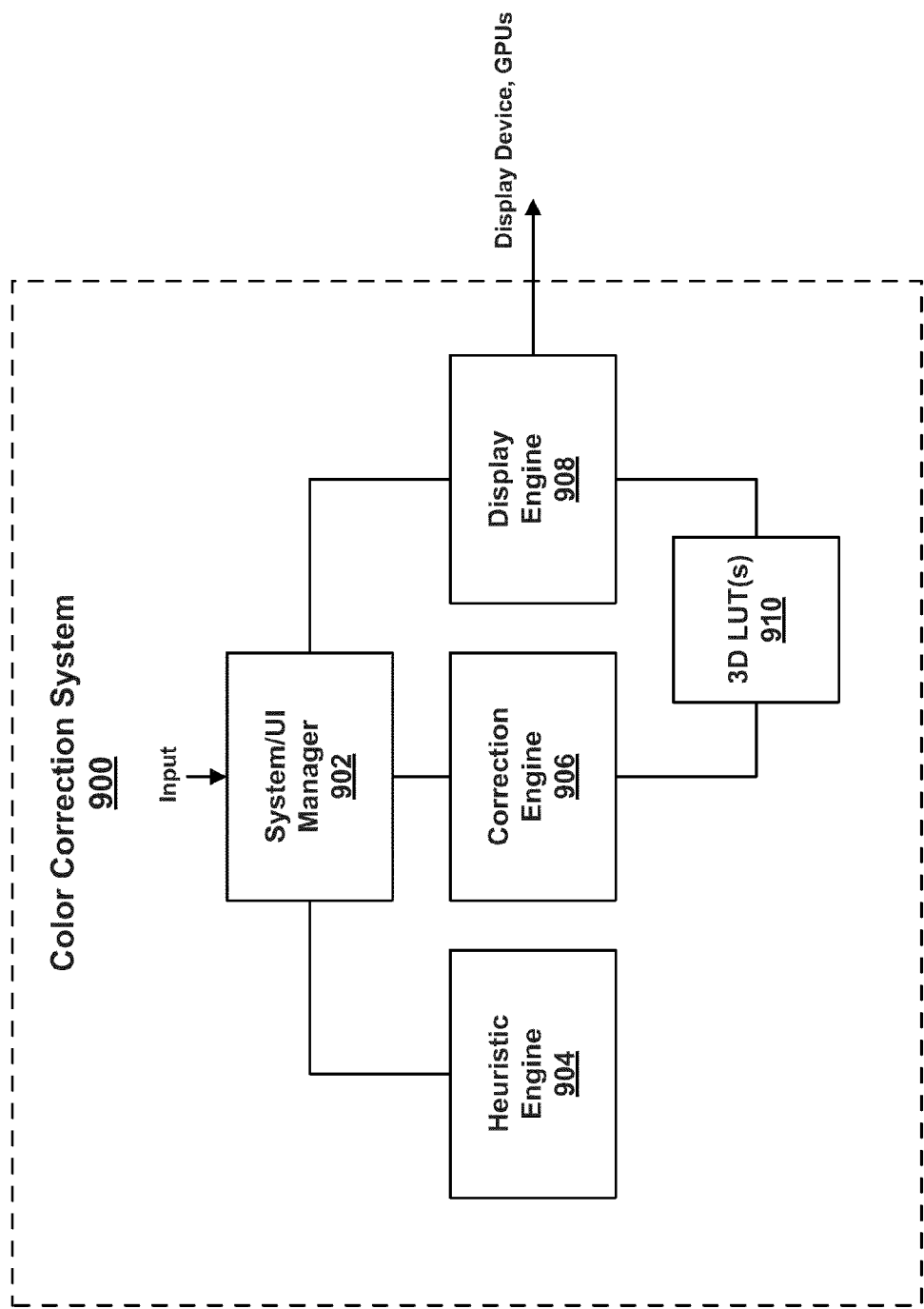
FIG. 9 is a block diagram of an exemplary color correction system incorporating 3D LUTs.

FIG. 9 is a block diagram of an exemplary color correction system 900. The color correction system 900 includes a system/UI manager 902, a heuristic engine 904, a correction engine 906, a display engine 908 and one or more 3D LUTs 910. The system/UI manager 902 receives user input (e.g., control inputs) from a UI and sends the input to the heuristic engine 904 and/or the correction engine 906 depending upon the type of input and the current mode of the system 900. For example, if the user selects a range of pixel values from a digital image, the system/UI manager 902 sends the sample range to the heuristic engine 904 to be analyzed. The heuristic engine 904 uses, for example, data from expert level colorists to determine an intended correction based on the sample range. For example, if the pixels are mostly black or dark, the heuristic engine 904 may interpret the intended correction to be a luminance range adjustment. The heuristic engine 902 informs the system/UI manger 902 of the intended correction. The system/UI manager 902 instructs the display engine 908 to present a correction interface with luminance controls on the digital image, and to populate the correction interface with appropriate luminance data. This same process can apply to hue, saturation and exposure corrections based on a selected sample range.

When the correction interface is displayed, the user can make adjustments using one or more controls in the correction interface (e.g., a slider, button, editable curve, etc.). User interactions with the controls are received by the system/UI manager 902 and sent to the correction engine 906. The correction engine 9006 includes various algorithms for generating color corrections, such as matrix transformations, color space warping and the like. The correction engine 906 also determines new color values for 3D LUT 910. The 3D LUT can be initialized by the system/UI manager 902 with color values upon the loading of the digital image. The digital image can be rapidly processed by the display engine 908 which replaces pixel values in the digital image that are in the sample range with corrected values provided by the 3D LUT 910. Techniques for color correcting digital images using a 3D LUT are described in co-pending U.S. patent application Ser. No. 11/408,783, entitled "3D LUT Techniques For Color Correction of Images".

The System/UI Manager 902 is responsible for generating and displaying the 3D histograms, shown in FIGS. 6-8. When the user selects one or more colors from a digital image, the System/UI manager 902 receives the selected color and instructs the display engine 908 to display in a display area references corresponding to colors plotted or selected from a digital image, as shown in FIG. 8a. In response to input, the System/UI Manager 902 instructs the display engine 908 to display gradient surfaces including projections corresponding to the references.

User System Architecture

Figure 10:
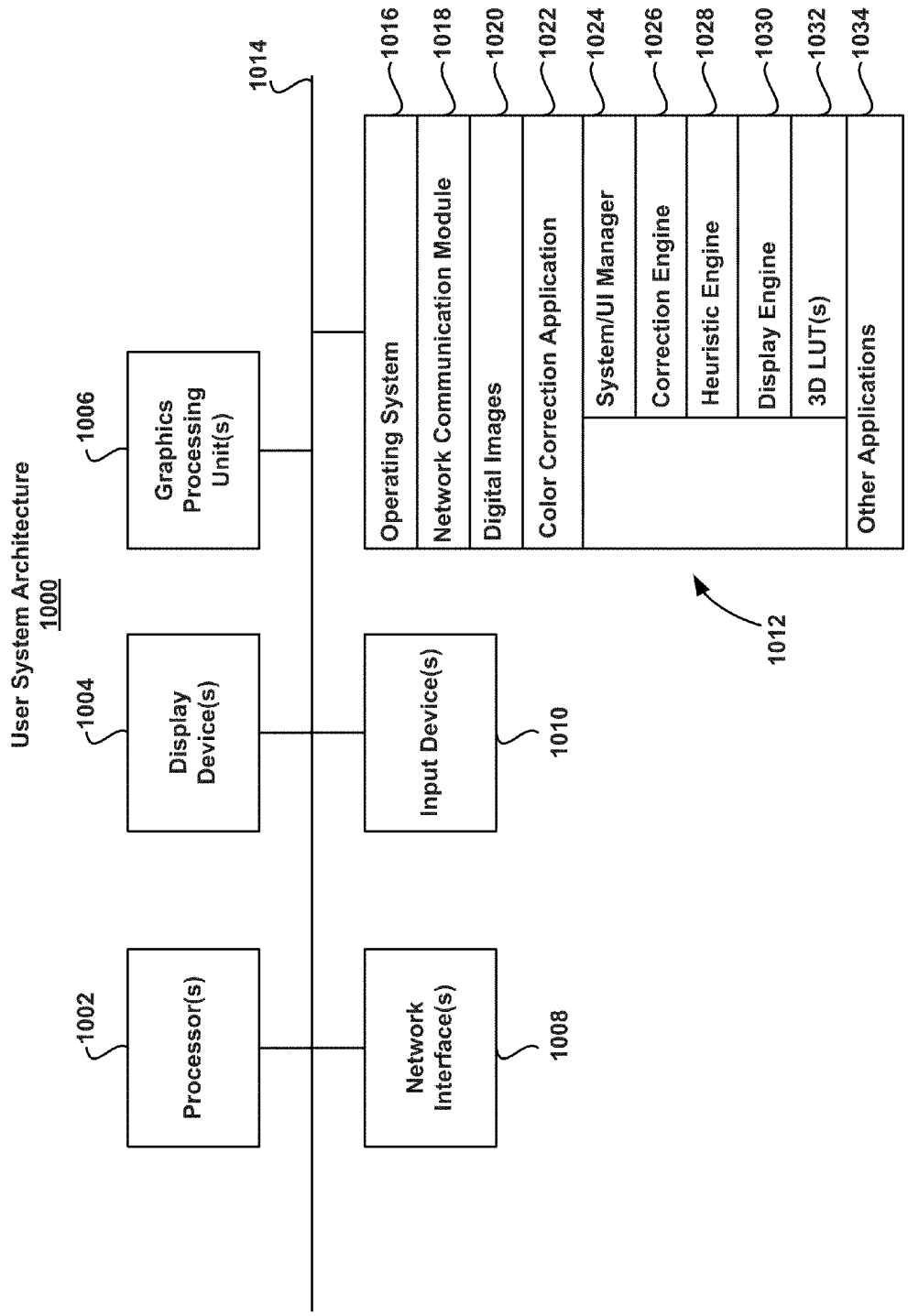
FIG. 10 is a block diagram of an exemplary user system architecture.

FIG. 10 is a block diagram of an exemplary user system architecture 1000 for hosting the color correction system 900. The architecture 1000 includes one or more processors 1002 (e.g., IBM PowerPC®, Intel Pentium® 4, etc.), one or more display devices 1004 (e.g., CRT, LCD), one or more graphics processing units 1006 (e.g., NVIDIA® Quadro FX 4500, GeForce® 7800 GT, etc.), one or more network interfaces 1008 (e.g., Ethernet, FireWire, USB, etc.), one or more input devices 1010 (e.g., keyboard, mouse, etc.), and one or more computer-readable mediums 1012 (e.g. SDRAM, optical disks, hard disks, flash memory, L1 or L2 cache, etc.). These components exchange communications and data via one or more buses 1014 (e.g., EISA, PCI, PCI Express, etc.).

The term "computer-readable medium" refers to any medium that participates in providing instructions to a processor 1002 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 1012 further includes an operating system 1016 (e.g., Mac OS®, Windows®, Linux, etc.), a network communication module 1018, one or more digital images or video clips 1020 and a color correction application 1022. The color correction application 1022 further includes a system/UI manager 1024, a correction engine 1026, a heuristic engine 1028, a display engine 1030 and one or more 3D LUTs 1032. Other applications 1034 can include any other applications residing on the user system, such as a browser, compositing software (e.g., Apple Inc.'s Shake® digital compositing software), a color management system, etc. In some implementations, the color correction application 1022 can be integrated with other applications 1034 or be configured as a plug-in to other applications 1034.

The operating system 1016 can be multi-user, multiprocessing, multitasking, multithreading, real-time and the like. The operating system 1016 performs basic tasks, including but not limited to: recognizing input from input devices 1010; sending output to display devices 1004; keeping track of files and directories on computer-readable mediums 1012 (e.g., memory or a storage device); controlling peripheral devices (e.g., disk drives, printers, GPUs 1006, etc.); and managing traffic on the one or more buses 1014. The network communications module 1018 includes various components for establishing and maintaining network connections (e.g., software for implementing communication protocols, such as TCP/IP, HTTP, Ethernet, etc.). The digital images 1020 can be a video clip of multiple digital images or a single image. The color correction application 1022, together with its components, implements the various tasks and functions, as described with respect to FIGS. 1-9. If the GPUs 1006 have built-in support to process 3D meshes, the 3D LUT operations are preferably performed by the GPUs 1006 to improve system performance.

The user system architecture 1000 can be implemented in any electronic or computing device capable of hosting a color correction application, including but not limited to: portable or desktop computers, workstations, main frame computers, network servers, etc.

Various modifications may be made to the disclosed implementations and still be within the scope of the following claims.

What is claimed is:

1. A computer-implemented method, comprising:
obtaining a color distribution of a digital image;
providing multiple axes representing a three dimensional (3D) color space, the 3D color space comprising a surface defined by at least two axes of the multiple axes, the surface indicating a gradient in the 3D color space; and
providing for display in the 3D color space a 3D histogram representing the color distribution of the digital image, including:
providing for display multiple pixels in the 3D color space, each pixel corresponding to a color of the digital image; and
providing a projection of at least one pixel of the multiple pixels for display on the surface, the projection representing an axis intersection between the at least two axes and the color corresponding to the at least one pixel, wherein the method is performed by one or more processors.

2. The method of claim 1, wherein the color space is one of RGB (Red, Green, Blue) or HLS (Hue, Lightness and Saturation).

3. The method of claim 1, wherein the gradient indicated by the surface is a color gradient.

4. The method of claim 1, wherein the 3D color space comprises another surface indicating a lightness gradient.

5. The method of claim 4, wherein providing for display in the 3D color space the 3D histogram comprises providing a projection of the at least one pixel of the multiple pixels for display on the other surface.

6. The method of claim 1, wherein the projection is painted using the color corresponding to the at least one pixel.

7. The method of claim 1, comprising identifying the color corresponding to the at least one pixel based on a user selection of a region of the digital image.

8. A non-transitory computer-readable medium having stored thereon instructions which, when executed by a processor, cause the processor to perform operations comprising:
obtaining a color distribution of a digital image;
providing multiple axes representing a three dimensional (3D) color space, the 3D color space comprising a surface defined by at least two axes of the multiple axes, the surface indicating a gradient in the 3D color space; and
providing for display in the 3D color space a 3D histogram representing the color distribution of the digital image, including:
providing for display multiple pixels in the 3D color space, each pixel corresponding to a color of the digital image; and
providing a projection of at least one pixel of the multiple pixels for display on the surface, the projection representing an axis intersection between the at least two axes and the color corresponding to the at least one pixel.

9. The medium of claim 8, wherein the color space is one of RGB (Red, Green, Blue) or HLS (Hue, Lightness and Saturation).

10. The medium of claim 8, wherein the gradient indicated by the surface is a color gradient.

11. The medium of claim 8, wherein the 3D color space comprises another surface indicating a lightness gradient.

12. The medium of claim 11, wherein providing for display in the 3D color space the 3D histogram comprises providing a projection of the at least one pixel of the multiple pixels for display on the other surface.

13. The medium of claim 8, wherein the projection is painted using the color corresponding to the at least one pixel.

14. The medium of claim 8, the operations comprising identifying the color corresponding to the at least one pixel based on a user selection of a region of the digital image.

15. A system, comprising:
a processor configured to perform operations including:
obtaining a color distribution of a digital image;
providing multiple axes representing a three dimensional (3D) color space, the 3D color space comprising a surface defined by at least two axes of the multiple axes, the surface indicating a gradient in the 3D color space; and
providing for display in the 3D color space a 3D histogram representing the color distribution of the digital image, including:
providing for display multiple pixels in the 3D color space, each pixel corresponding to a color of the digital image; and
providing a projection of at least one pixel of the multiple pixels for display on the surface, the projection representing an axis intersection between the at least two axes and the color corresponding to the at least one pixel.

16. The system of claim 15, wherein the color space is one of RGB (Red, Green, Blue) or HLS (Hue, Lightness and Saturation).

17. The system of claim 15, wherein the gradient indicated by the surface is a color gradient.

18. The system of claim 15, wherein the 3D color space comprises another surface indicating a lightness gradient.

19. The system of claim 18, wherein providing for display in the 3D color space the 3D histogram comprises providing a projection of the at least one pixel of the multiple pixels for display on the other surface.

20. The system of claim 15, wherein the projection is painted using the color corresponding to the at least one pixel.

21. The system of claim 15, the operations comprising identifying the color corresponding to the at least one pixel based on a user selection of a region of the digital image.

* * * * *

UNITED STATES PATENT AND TRADEMARK OFFICE
CERTIFICATE OF CORRECTION

| | | |
|---|---|---|
| PATENT NO. | : 8,203,571 B2 | Page 1 of 1 |
| APPLICATION NO. | : 13/227282 | |
| DATED | : June 19, 2012 | |
| INVENTOR(S) | : Daniel Pettigrew et al. | |

It is certified that error appears in the above-identified patent and that said Letters Patent is hereby corrected as shown below:

Column 1, Line 12, Delete "Ser," and insert -- Ser. --
Column 1, Line 13, Delete "Images." and insert -- Images". --

Signed and Sealed this
Twenty-seventh Day of November, 2012

David J. Kappos
*Director of the United States Patent and Trademark Office*